US012527300B1

(12) United States Patent
Anderson

(10) Patent No.: US 12,527,300 B1
(45) Date of Patent: Jan. 20, 2026

(54) DURABLE PET TOY WITH SCENT-RETENTION CAPABILITY

(71) Applicant: Patrick Anderson, Cleveland, TN (US)

(72) Inventor: Patrick Anderson, Cleveland, TN (US)

( * ) Notice: Subject to any disclaimer, the term of this patent is extended or adjusted under 35 U.S.C. 154(b) by 0 days.

(21) Appl. No.: 19/171,695

(22) Filed: Apr. 7, 2025

(51) Int. Cl.
*A01K 15/02* (2006.01)
*A63H 3/00* (2006.01)

(52) U.S. Cl.
CPC ........ *A01K 15/025* (2013.01); *A01K 15/0207* (2025.08)

(58) Field of Classification Search
CPC .............. A01K 15/025; A01K 15/0207; A01K 15/0201; A63H 3/005
See application file for complete search history.

(56) References Cited

U.S. PATENT DOCUMENTS

| | | | |
|---|---|---|---|
| 4,816,000 A * | 3/1989 | Hsu ........................ | A63H 3/005 |
| | | | 206/457 |
| 7,146,934 B1 * | 12/2006 | Staley .................. | A01K 15/026 |
| | | | 119/711 |
| 8,181,599 B1 | 5/2012 | Jeffers | |
| 10,070,621 B1 | 9/2018 | David | |
| 10,561,955 B1 * | 2/2020 | Renjie .................... | A63H 3/005 |
| 10,813,342 B2 * | 10/2020 | Maughan ................ | A01K 15/02 |
| 2001/0029903 A1 | 10/2001 | Suchowski et al. | |
| 2005/0166865 A1 | 8/2005 | Handelsman et al. | |
| 2011/0197818 A1 | 8/2011 | Simon et al. | |
| 2013/0303046 A1 * | 11/2013 | Adam .................. | B65D 81/365 |
| | | | 446/73 |
| 2014/0270931 A1 * | 9/2014 | Jager ..................... | A01K 15/025 |
| | | | 403/343 |
| 2017/0118958 A1 * | 5/2017 | Ma .......................... | A01K 5/00 |
| 2018/0206452 A1 * | 7/2018 | Lai ....................... | A01K 15/025 |
| 2019/0133078 A1 * | 5/2019 | Blatt ..................... | A01K 15/025 |
| 2021/0204517 A1 | 7/2021 | Bentz et al. | |
| 2022/0323830 A1 * | 10/2022 | Cleghorn ............... | A63B 39/00 |
| 2024/0084215 A1 | 3/2024 | Yellin | |

FOREIGN PATENT DOCUMENTS

JP          2015221030 A  * 12/2015

* cited by examiner

*Primary Examiner* — Kristen C Hayes
(74) *Attorney, Agent, or Firm* — Gugliotta & Gugliotta LPA

(57) ABSTRACT

A durable pet toy for managing companion animal separation anxiety is provided having a hollow, doll-shaped body fabricated from puncture and tear-resistant Kevlar®-reinforced material with an exterior surface and an interior cavity. A threaded receiver fixed to the exterior surface provides access to the interior cavity and interfaces with a removable threaded plug. A plurality of vent holes disposed in the plug enable scent transmission from owner-worn articles placed within the interior cavity. The toy incorporates baseball seam stitching with Kevlar® thread for enhanced durability. The plug includes a cylindrical bottom section with a threaded outer surface, a concave top section, and a handle positioned perpendicularly on the top section to facilitate removal. The invention addresses the persistent need for a pet anxiety management solution that combines extreme durability with effective scent delivery capabilities, thereby providing psychological comfort to companion animals experiencing separation from their primary caregivers.

10 Claims, 3 Drawing Sheets

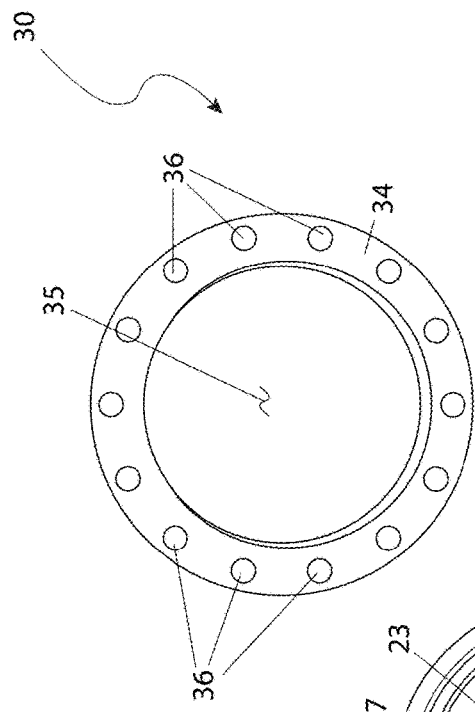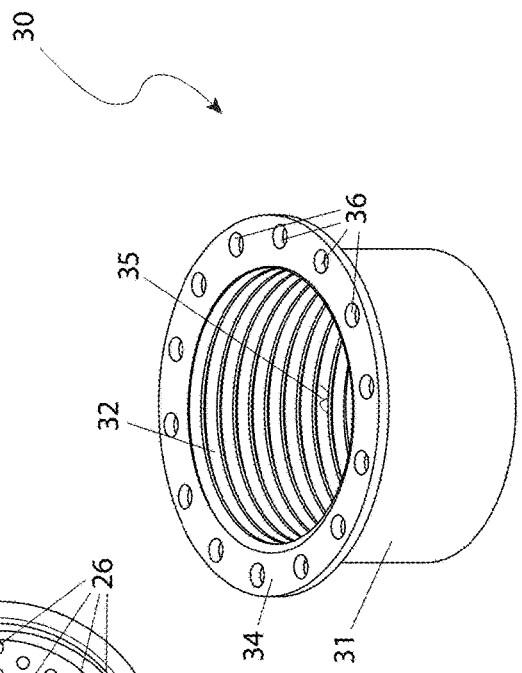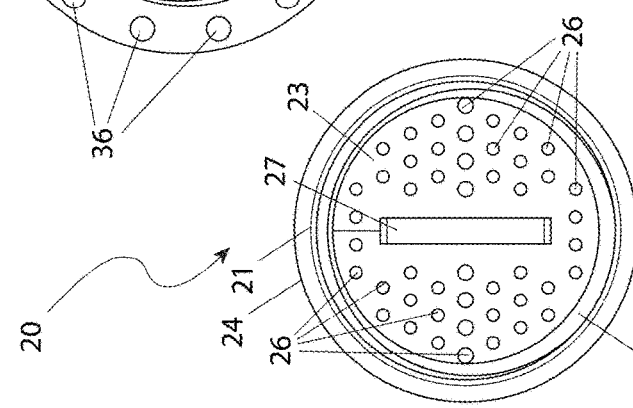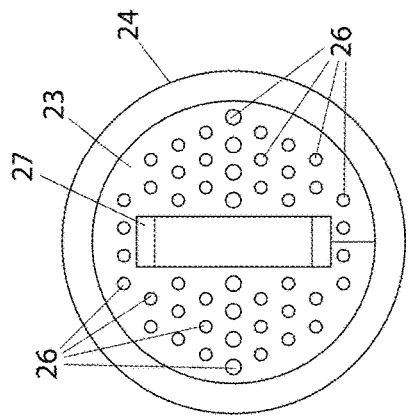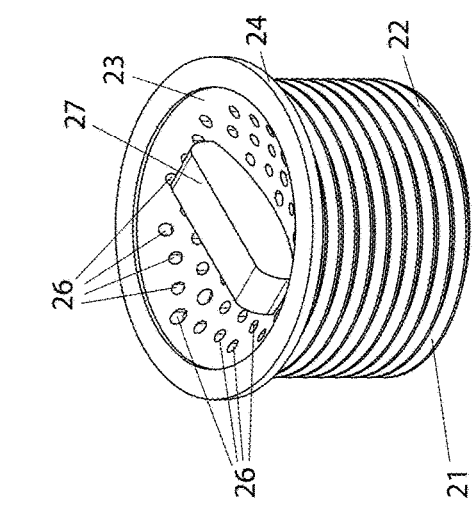

DURABLE PET TOY WITH SCENT-RETENTION CAPABILITY

CROSS-REFERENCE TO RELATED APPLICATIONS

There are no previously filed, nor currently any co-pending applications, anywhere in the world.

BACKGROUND OF THE INVENTION

1. Field of the Invention

The present invention relates to veterinary behavioral management products, specifically addressing companion animal separation anxiety through a durable, scent-transmissive containment device with controlled access mechanisms for incorporating owner-associated olfactory materials.

2. Description of the Related Art

Separation anxiety represents a significant behavioral challenge in domesticated animals, particularly canines, manifesting through destructive behaviors, vocalization, and physiological distress when separated from primary caregivers. According to veterinary behavioral research, approximately 20-40% of dogs presented to veterinary behavioral specialists suffer from separation-related disorders.

Conventional approaches to addressing animal separation anxiety include pharmaceutical interventions, behavioral modification techniques, and environmental enrichment strategies. Among these, scent-based interventions have demonstrated efficacy, leveraging the highly developed olfactory capabilities of pets to provide psychological comfort through familiar human scents.

Existing commercial products in this domain suffer from significant limitations. Standard plush toys, while often employed as carriers for human scent, typically demonstrate insufficient durability, succumbing to destruction by anxious animals, particularly those exhibiting heightened stress-related behaviors. This destruction not only renders the product ineffective but potentially creates ingestion hazards.

Conversely, existing durable pet toys, typically manufactured from solid rubber or similar materials, lack appropriate means for incorporating and retaining human-scented materials. While resistant to destruction, such products fail to address the fundamental anxiety management requirement of scent delivery.

Several attempts have been made to combine durability with scent delivery functionality. For example, US20190133078A1 discloses a dog toy incorporating human scent, but lacks the specific Kevlar-reinforced construction and threaded access system of the present invention. U.S. Pat. No. 10,070,621B1 addresses anxiety through scent but implements this in a wearable format rather than a toy, limiting its application to specific contexts.

Additional prior art includes various scented chew toys (Application Publication No. 2001/0029903) and multipart toys (Application Publication No. 2005/0166865), but these typically incorporate artificially formulated scents rather than accommodating actual owner-worn items, significantly reducing their efficacy for separation anxiety management.

A persistent need exists for a pet anxiety management device combining:

Sufficient durability to withstand aggressive interaction by distressed animals;
Effective means for incorporating and retaining genuine owner-scented materials;
Controlled release of scent compounds to maximize therapeutic effect; and
Safe, repeated access to the interior compartment for scent material replacement.

The present invention addresses these deficiencies through a novel combination of structural elements, materials selection, and functional design parameters. By providing a Kevlar-reinforced exterior with a specialized threaded access system and ventilation apertures, the invention enables effective transmission of owner-associated scents while maintaining structural integrity under conditions of aggressive interaction typically associated with separation anxiety behaviors.

SUMMARY OF THE INVENTION

It is thus an object of the present invention to provide a durable, hollow pet toy with a secure threaded access mechanism and integrated ventilation apertures for containing owner-scented items, thereby mitigating separation anxiety in companion animals while withstanding destructive behaviors commonly associated with such psychological distress.

It is a feature of the present invention to incorporation of a removable plug assembly characterized by a concave top section with precisely dimensioned ventilation apertures (3/32" to 1/8") that facilitate controlled scent transmission while maintaining structural integrity.

The present invention provides a durable hollow receptacle with a specialized access mechanism designed to contain owner-associated olfactory materials. The structural configuration incorporates a primary body fabricated from puncture and tear-resistant materials, particularly cowhide and/or Kevlar®, with reinforced seam integrity achieved through doubled baseball-style stitching patterns using high-tensile Kevlar® thread throughout the perimeter. This construction methodology addresses the persistent durability limitations observed in conventional pet toys while maintaining necessary flexibility.

Central to the invention's functionality is a sophisticated removable access system consisting of complementary male and female threaded components. The female receiver element affixes permanently to the exterior surface of the primary body via multiple evenly-distributed fasteners, creating an aperture into the hollow interior cavity. The corresponding male plug incorporates a cylindrical bottom section with external threading and transitions to a concave top section featuring a plurality of ventilation apertures ranging from three-thirty-seconds to one-eighth inch in diameter.

The male plug further includes an ergonomically designed handle element positioned perpendicular to the plug top section, providing dual functionality as both a carrying lug and removal mechanism. The handle's upper surface remains flush with the plug flange, minimizing inadvertent disengagement risk. When properly engaged, the plug and receiver components create an environmentally communicative seal wherein the ventilation apertures permit controlled gaseous exchange between the interior cavity and external environment.

The invention's interior cavity is specifically dimensioned to accommodate various scent-impregnated materials associated with the animal's primary caregiver, including textile articles with established human olfactory signatures. This configuration facilitates the controlled release of familiar human scent compounds, thereby providing psychological comfort to animals experiencing separation anxiety.

It is an advantage of the present invention that it provides enhanced durability through the implementation of Kevlar-reinforced construction and double baseball stitching, thereby substantially increasing resistance to destruction by anxious animals.

It is another advantage of the present invention that it incorporates a threaded plug-receiver system enabling secure closure while permitting repeated access to the interior compartment without degradation of structural integrity.

It is another advantage of the present invention that it facilitates controlled scent emission through precisely dimensioned ventilation apertures, optimizing the therapeutic effect of owner-associated olfactory compounds.

It is another advantage of the present invention that it enables incorporation of actual owner-worn items rather than synthetic scent compounds, thereby maximizing familiarity and anxiety-reduction efficacy.

It is another advantage of the present invention that it provides an ergonomic handle element that serves dual functionality as both carrying mechanism and removal aid for the threaded plug.

It is another advantage of the present invention that it maintains structural integrity while simultaneously permitting environmental communication between interior and exterior environments.

It is another advantage of the present invention that it offers versatile aesthetic configurations while maintaining consistent functional elements, thereby accommodating diverse consumer preferences.

It is another advantage of the present invention that it addresses multiple failure modes observed in prior art solutions by integrating durability, accessibility, and scent-transmission capabilities in a single device.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

FIG. 2a is a top plan view of the plug 20, according to the preferred embodiment of the present invention;

FIG. 2b is a top isometric view of the plug 20, according to the preferred embodiment of the present invention;

FIG. 2c is a bottom plan view of the plug 20, according to the preferred embodiment of the present invention;

FIG. 3a is a top plan view of a receiver 30, according to the preferred embodiment of the present invention;

FIG. 3b is a top isometric view of the receiver 30, according to the preferred embodiment of the present invention; and, FIG. 4 is an in-use illustration of an exemplary method of use of the doll 10, showing a scented material 50 stored within the cavity 15 of the doll 10.

DETAILED DESCRIPTION OF THE INVENTION

Figure 1:
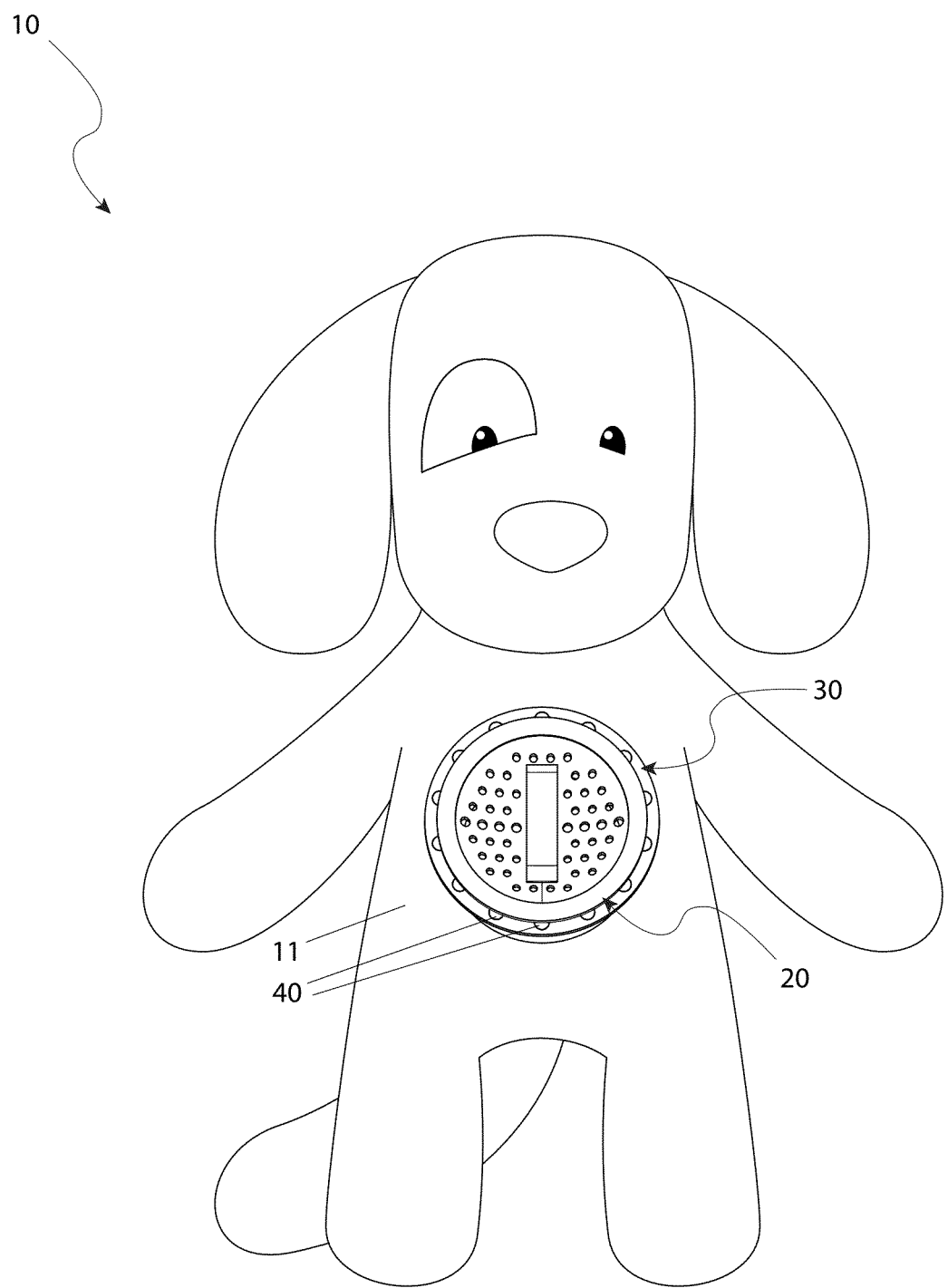
FIG. 1 is a front elevation view of a doll 10 with a removable plug 20, according to a preferred embodiment of the present invention.
Figure 4:
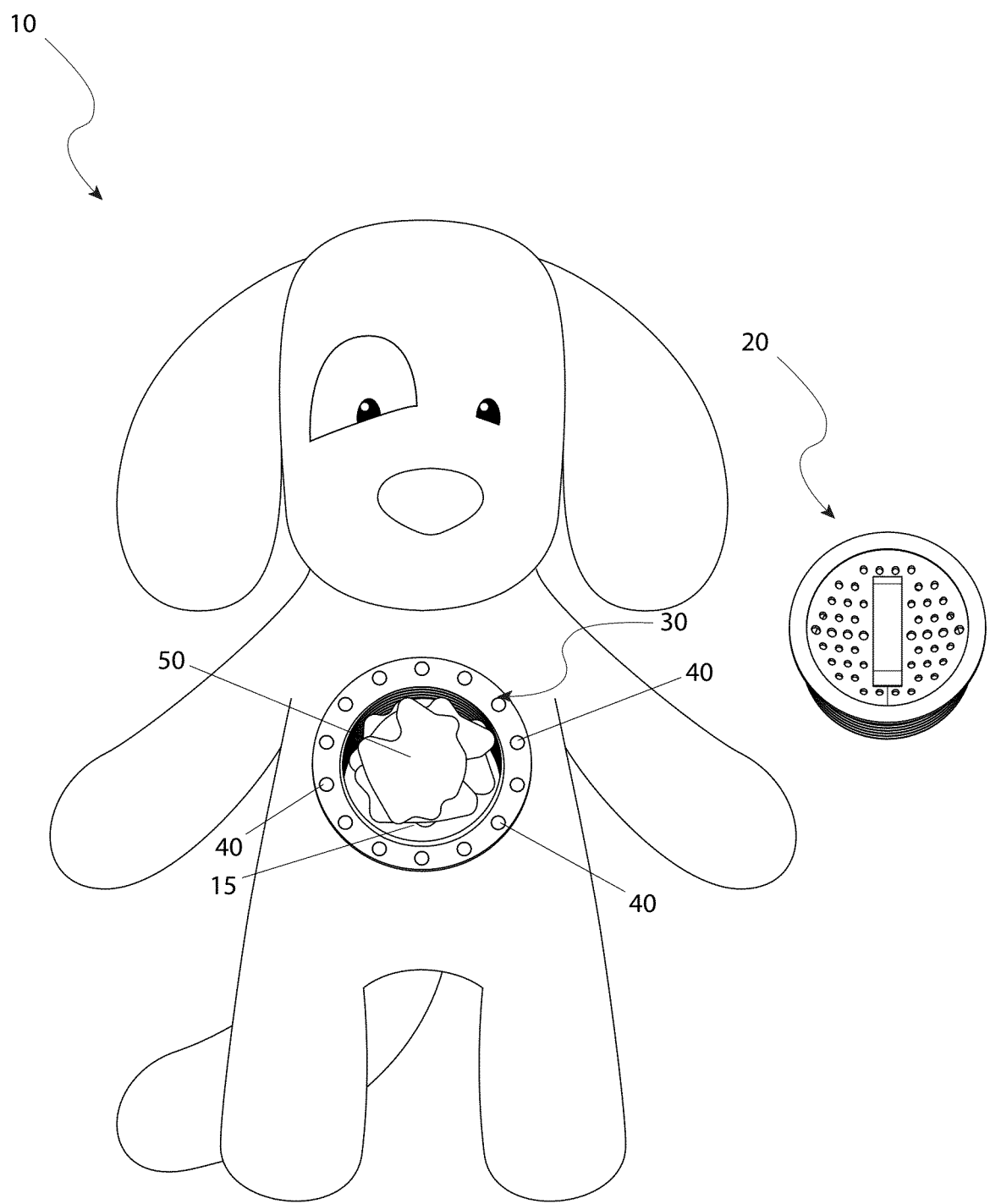

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, a doll, generally noted as 10, is shown according to the preferred embodiment of the present invention. The doll 10 that is capable of being used as a play toy for an animal such as a pet dog. The doll 10 has an exterior surface 11 and a hollow interior 15 capable of receiving stuffing or scented material 50 therein. In order to accomplish this, there is a plug 20 that can be removably attached to a receiver 30. The receiver 30 is fixed to the exterior surface 11 of the doll 10 via a plurality of fasteners 40 and has portion that extends into the interior 15 to provide access thereto. The plug 20 is then replaced on the receiver 30 to entrap any stuffing or scented material 15 therein. A plurality of vent holes 26 on the plug 20 enable the scent of the scented material 50 to emanate from the interior 15 to the environment. The scented material 50 within the doll 10 may be clothing worn by or associated with an owner of the animal, which is intended to provide a calming effect for the animal that may suffer from separation anxiety from the owner when not present.

In certain embodiments, the doll 10 is fabricated from puncture- and tear-resistant material (e.g. cowhide, Kevlar®, etc.) so that the animal cannot inadvertently damage, ingest, or destroy the doll 10. Further, it is preferred that the doll 10 is manufactured with rolled or doubled stitching (e.g., baseball seam stitching) with thread made from Kevlar® for the same purposes. In a typical method of fabrication, the doll 10 is inserted inside-out with the stitching effect about the entire perimeter of two (2) identically shaped halves of the overall design of the doll 10, leaving a small opening unstitched. When turned right-side out, the opening can be used for stuffing the interior and the opening is finally stitched closed. The interior 15 of the doll 10 may be provided with stuffing material or empty for subsequent filling. There may or may not be other fastener openings (e.g., zipper, snap buttons, etc.) providing access to the interior 15. Although in the exemplary embodiment the doll 10 is depicted as a stuffed dog, it is understood that the design of the doll 10 may include other animals or decorative subjects and as such, shall not limit the scope of the invention The overall size of the doll 10 may be dependent on the design, but can generally be eighteen to twenty inches (18-20 in.) in length.

Referring now to FIGS. 2a-2c which depict various views of the plug 20, it can be seen that the plug 20 has a plug bottom section 21 and a plug top section 23. The plug bottom section 21 is constructed as a hollow cylinder having a smooth inner surface and plug threaded area 22 on an outer surface. The plug top section 23 is concave in shape and can extend within the plug bottom section 21 to approximately one-half inch (½ in.) at the center. The plug top section 23 is symmetrical about a bisecting axis and spans between the upper terminal end of the plug bottom section 21. A plug flange 24 circumscribes the outer surface of the plug bottom section 21 at the terminal upper end thereof, such that the inner edges thereof are an extension of the plug top section 23. Intermittently or equidistantly-spaced along the plug top section 23 are a plurality of vent holes 26 that pass through the plug top section 23. The plurality of vent holes 26 may be arranged in such a manner so as to provide decorative functionality or they may be arranged as a patterned matrix. Perpendicularly situated on the plug top section 23 along a bisecting center line and terminating prior to the plug flange 24 is a handle 27. The handle 27 may have a solid upper surface and a hollow bottom section. In a preferred embodiment, the handle 27 should have an upper surface that does not protrude away from the plug flange 24 and is level therewith. The handle 27 is particularly suited to act as a lug to carry the doll 10 and has an ergonomic design to permit a user to grasp it when removing the plug 20 from the receiver 30.

Referring now to FIGS. 3a-3b, various views of the receiver 30 illustrate a receiver bottom section 31 and a receiver flange 34. The receiver bottom section 31 is also constructed as a hollow cylinder where the hollow portion is defined as a receiver interior 35. The receiver bottom section 31 has a smooth outer surface and a receiver threaded section 24 on an inner surface thereof. A receiver flange 34 circumscribes the outer surface of the receiver bottom section 31 at the terminal upper end thereof. Equidistantly-spaced about the receiver flange 31, preferably along a common intersecting line, is a plurality of apertures 36. Each of the plurality of apertures 36 permit the passing of a fastener 40 therethrough to facilitate coupling the receiver 30 to the exterior surface 11 of the doll 10.

In certain embodiments, the plug 20 and receiver 30 each comprise a resilient, inert, and hypo-allergenic material such as plastic that resists damage or destruction when in contact with the animal. The receiver 30 is sized to fit into a formed aperture on the doll 10 of approximately four and one-half inches (4½ in.) in diameter. The inner diameter of the receiver bottom section 31 is sized to permit the plug threaded section 24 to engage with and mate to the receiver threaded section 34, thereby enabling a removable coupling for the plug 20 and the receiver 30. When the plug 20 is coupled to the receiver 30, the plug flange 24 can rest upon the receiver flange 34 and the vent holes are in environmental communication with the receiver interior 35 and the interior 15 of the doll 10. The vent holes 16 permit the passage of scent from any scented material 50 placed within the interior 15. In certain embodiments, the diameter of the vent holes 26 may be uniform and can be three-thirty-seconds of an inch to one-eight of an inch (³⁄₃₂-⅛ in.).

2. Operation of the Preferred Embodiment

The operation of the invention is elegantly straightforward while addressing a complex behavioral challenge. When a companion animal experiences separation anxiety due to the absence of their owner, the invention provides a durable scent-delivery mechanism that offers psychological comfort.

In practical application, the user unscrews the threaded plug from the receiver by gripping and rotating the ergonomically designed handle. This provides access to the interior cavity of the doll-shaped toy. The user then inserts a recently worn, unwashed personal garment or other scent-bearing article belonging to the owner into the cavity. Upon reinstallation of the plug into the receiver via the complementary threaded sections, the precisely dimensioned vent holes permit molecular olfactory compounds to emanate from the interior into the external environment at a controlled rate, while simultaneously preventing the companion animal from directly accessing or extracting the scented material.

The Kevlar®-reinforced construction with baseball seam stitching enables the toy to withstand aggressive interaction, including chewing, clawing, and tossing behaviors commonly exhibited by anxious animals. The mechanical integrity of the threaded coupling system ensures secure containment even during vigorous play. The ergonomic handle facilitates periodic replacement of the scented material as olfactory potency diminishes, typically every 3-7 days depending on environmental conditions and material properties.

This operational simplicity belies the sophisticated technical solution that effectively combines materials science, mechanical engineering principles, and veterinary behavioral science in addressing companion animal separation anxiety without pharmaceutical intervention.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A durable pet toy for managing companion animal separation anxiety, comprising:
    a hollow, doll-shaped body having an exterior surface and an interior cavity;
    said exterior surface being fabricated from puncture and tear-resistant aramid fiber reinforced material;
    a threaded receiver fixed to said exterior surface, said receiver providing access to said interior cavity;
    a removable threaded plug configured to engage with said receiver; and
    a plurality of vent holes disposed in said plug enabling scent transmission from materials placed within said interior cavity.

2. The pet toy of claim 1, wherein said exterior surface is manufactured with baseball seam stitching using a para-aramid synthetic fiber or high strength aramid fiber thread.

3. The pet toy of claim 1, wherein said plug comprises:
    a cylindrical bottom section having a threaded outer surface;
    a concave top section; and
    a handle positioned perpendicularly on said top section.

4. The pet toy of claim 3, wherein said handle has an upper surface that is substantially level with a plug flange that circumscribes said bottom section.

5. The pet toy of claim 1, wherein said plurality of vent holes have diameters between three-thirty-seconds of an inch to one-eighth of an inch (3/32-1/8 in.).

6. The pet toy of claim 1, wherein said receiver is attached to said exterior surface via a plurality of fasteners passing through apertures in a receiver flange.

7. The pet toy of claim 1, wherein said doll-shaped body is configured to resemble a companion animal.

8. The pet toy of claim 1, wherein the overall length of said doll-shaped body is between eighteen to twenty inches (18-20 in.).

9. The pet toy of claim 1, wherein said interior cavity is dimensioned to receive and retain clothing articles worn by an owner of a companion animal.

10. A method for managing companion animal separation anxiety, comprising:
    providing a durable pet toy according to claim 1;
    removing said threaded plug from said threaded receiver;
    inserting an owner-worn article of clothing into said interior cavity;
    replacing said threaded plug into said threaded receiver; and
    presenting the assembled toy to a companion animal experiencing separation anxiety.

* * * * *